Sept. 13, 1966     W. R. WAYMAN     3,272,027

INTEGRAL GEAR AND DRIVE ECCENTRIC UNIT

Filed Nov. 18, 1964

United States Patent Office 3,272,027
Patented Sept. 13, 1966

3,272,027
INTEGRAL GEAR AND DRIVE ECCENTRIC UNIT
William R. Wayman, Indianapolis, Ind., assignor to Link-Belt Company, a corporation of Illinois
Filed Nov. 18, 1964, Ser. No. 412,603
5 Claims. (Cl. 74—243)

This invention relates to a machine element employed in a power transmitting drive and more particularly is concerned with an integral gear and drive eccentric unit. Such a unit has a field of application in internal combustion engines wherein the gear and drive eccentric function respectively as a timing chain sprocket and fuel pump drive.

The applicability and advantages of the integral unit forming the subject of this application may best be described with reference to utilization of such a unit in an internal combustion engine. In engines used in the automotive field it has been common practice for the cam shaft to be driven by a so-called "silent chain" engaging a sprocket mounted on the cam shaft of the engine. In recent years this sprocket driven by the chain engaged therewith has had the teeth thereof encased in a plastic, such as nylon. This construction presents the advantages of not only increased wear life for the teeth and chain but also reduced noise where a die-cast metal gear body is employed.

It has also been common practice to actuate the fuel pump in automobile engines by means of an eccentric on one of the rotating engine shafts such eccentric being engaged by the operating arm of the fuel pump. As the eccentric rotates during engine operation, the pump arm is rocked back and forth in following the eccentricity of the drive eccentric and in turn flexes the pump diaphragm to draw fuel from the fuel tank and supply it to the carburetor of the engine. Various recent automotive engines have employed a timing chain drive using separate die-cast sprockets with nylon molded over the sprocket teeth and then used a separate forged steel cup independently mounted eccentrically on the cam shaft end at the time of engine assembly, such forged steel eccentric cup functioning to drive the fuel pump.

It is a principal object of the instant invention to provide an integral gear and drive eccentric for use as a sprocket for a silent chain timing drive in an internal combustion engine and for driving the engine fuel pump.

Another object of this invention is to provide an integral gear and drive eccentric unit wherein the gear teeth and drive surface of the eccentric are encased in a wear resisting plastic.

It is also an object of the invention to provide a unitary cast metal gear and cylindrical drive eccentric wherein the gear teeth and drive surface of the eccentric are encased in a wear resistant plastic, such as nylon, and wherein the plastic casing on the eccentric is fixed against movement relative to the eccentric by the plastic extending into holes in the gear body which are offset from the cylindrical surface of the cast metal eccentric.

It is a further object of the instant invention to provide an integral cast metal gear and drive eccentric unit wherein the gear teeth and eccentric surface are encased in a wear resistant plastic with the plastic being simultaneously injection molded onto the teeth and eccentric surface and wherein the plastic sleeve is retained against movement on the metal cast eccentric by plugs of plastic molded into holes extending through the gear body and intersecting the metal surface of the cast eccentric.

The above and other objects of the instant invention will become more readily apparent by reference to the accompanying drawings in which a preferred embodiment is disclosed by way of example, various modifications and changes of details thereof being contemplated within the scope of the appended claims. The article of the invention is illustrated on the accompanying drawing in which:

Figure 1:
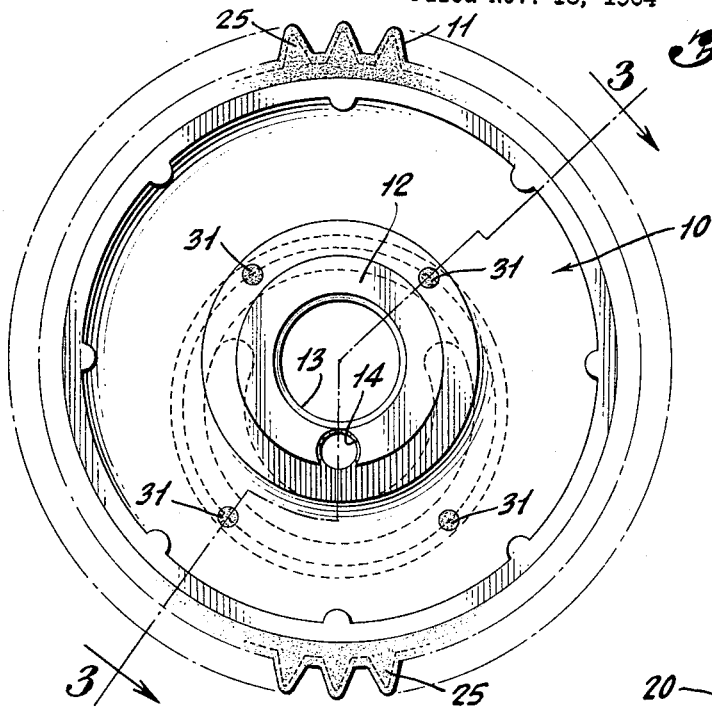
FIGURE 1 is an end view of the integral gear and drive eccentric unit of this invention.

The unitary gear and drive eccentric may best be described with reference to the sectional view of FIGURE 3. The unit includes a circular gear body 10 which is provided with a toothed portion around the periphery thereof made up of teeth 11. A hub 12 is formed as an integral part of the body and has a centrally disposed bore 13 by means of which the unit can be mounted on a shaft such as the cam shaft of an internal combustion engine.

Any appropriate means may be employed to fix the integral gear and drive eccentric unit to the shaft on which it is mounted. The unit may be keyed to the shaft or a drive pin (not shown) mounted to rotate with the shaft provided to engage with the hole 14 which extends through the hub 12 and is parallel to the axis of bore 13.

The body 10 is also provided with a cylindrical drive eccentric 20. The eccentric extends from one side of the circular gear body and is eccentric to the axis of hub 12 and the axis of bore 13 therein.

The circular gear body with the teeth 11, hub 12 and eccentric 20 may be suitably integrally formed by a die casting process. Advantageously the unit may be die cast of aluminum to provide a light-weight sprocket to be employed in the timing chain drive of an engine.

The circular gear body 10 has, as illustrated, a series of four holes 22 which extend through the body to intersect the cylindrical surface of the cast metal eccentric 20. As shown most clearly in the sectional view of FIGURE 3, these holes 22 are offset radially inwardly from the external cylindrical surface of cast metal eccentric 20 as shown at 23 on FIGURE 3. These holes function to retain the plastic sleeve that is molded on the unit as described hereinafter.

The toothed portion formed by the teeth 11 encircling the circular gear body 10 is encased with a wear resistant plastic, such as nylon. The plastic casing 25 not only encases the teeth 11 but also encloses a peripheral portion of the circular body 10 radially inwardly of the teeth 11. As shown on FIGURE 3, the periphery 26 of the body 10 radially inwardly of the toothed portion is provided on the opposite sides of the gear body with annular recesses 27. The plastic casing 25 embraces the periphery 26 and fills the recesses 27 such that the plastic casing is firmly retained on the toothed portion of the gear body by the portions of the plastic casing which fill the annular recesses 27. Although the exterior of the casing 25 is shown flush with the faces of the cast metal gear body, it will be appreciated that the plastic casing may be recessed inwardly from the faces of the gear body or may be of greater width than the width of the gear body adjacent the edge of the plastic casing.

Figure 3:
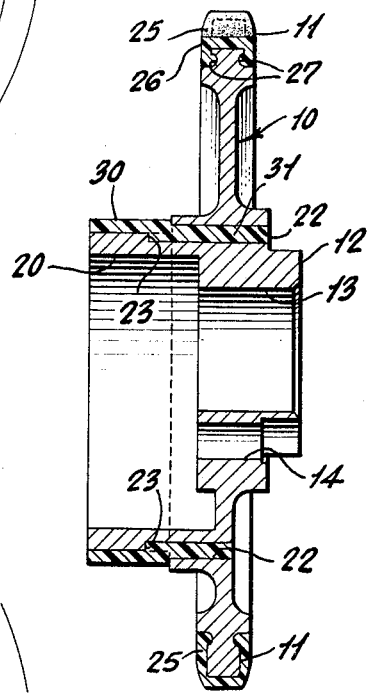
FIGURE 3 is a sectional view taken on line 3—3 of FIGURE 1.
Figure 2:
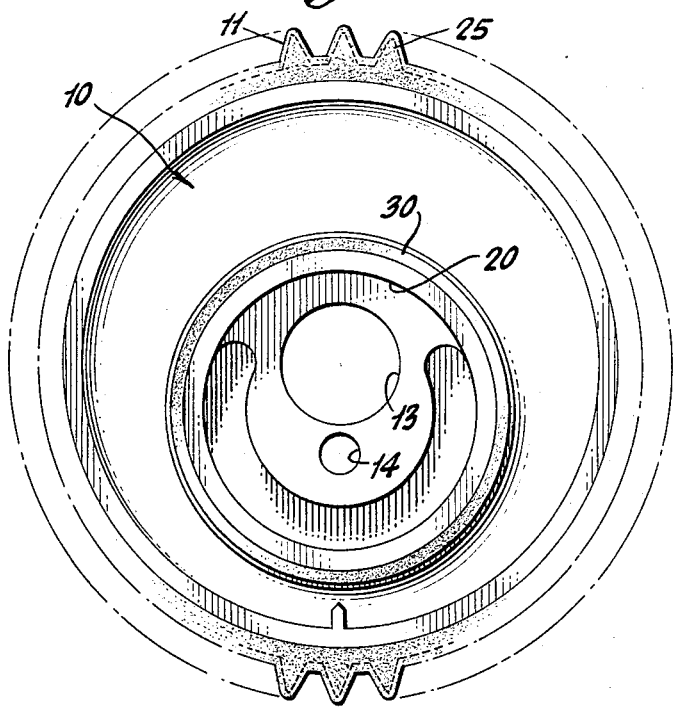
FIGURE 2 is a view similar to FIGURE 1 showing the opposite side of the unit.

It may be pointed out that as illustrated by the sectional view of FIGURE 3 the section line intersects the root between adjacent teeth at the top of the section shown. Thus the plastic casing 25 is shown in section at the root of the teeth. At the bottom of FIGURE 3 the section line extends through the center of one of the teeth thus the tooth is shown in section with plastic encasing it.

The cylindrical metal eccentric 20 has the external cylindrical surface thereof covered by a sleeve of plastic 30 molded thereon. Incident molding of the plastic sleeve 30 on eccentric 20 the plastic material flows into the four offset holes 22 to form plugs 31 integral with plastic sleeve 30. The flow of plastic through the holes may be suitably stopped at the side opposite eccentric 20 by pins engaging the open ends of these holes on the opposite side of the sprocket.

It will be appreciated that the plastic plugs 31 in holes 22 integral with sleeve 30 serve to prevent rotation of the plastic sleeve on the metal cast eccentric 20. Also the offset 23 provides a shoulder against which the plugs 31 engage to prevent the sleeve from moving laterally off of the cast metal eccentric 20. Thus movement of the sleeve 30 relative to eccentric 20 would require shearing the four plugs 31 from the sleeve and accordingly, the sleeve is permanently held on to the integral gear and drive eccentric unit.

The wear resisting plastic encasing the gear teeth 11 and the cylindrical drive eccentric 20 may be molded in place from a plastic such as nylon. The die cast body 10 may be appropriately placed in a plastic injection molding machine to apply the casing 25 of plastic to the toothed portion and the sleeve 30 of the plastic to eccentric 20. While rigidly held in place in an appropriate mold in such a machine, the toothed section and eccentric 20 preferably have the plastic injection molded therearound simultaneously. The flow of plastic during such injection molding continues into the holes 22 and can be blocked at the opposite face of the unit by appropriate pins closing the ends of such openings as mentioned hereinabove.

It is to be understood that the form of invention herein shown and described is to be taken only as a preferred embodiment of the invention and that various changes and modifications in the arrangement of the components may be resorted to without departing from the spirit or scope of the appended claims.

I claim:
1. An integral gear and drive eccentric unit comprising
a circular gear body having a toothed portion around the perimeter of said body,
a hub integral with and centrally disposed on said body for mounting said unit on a shaft,
a cylindrical drive eccentric integral with said body and extending from one side of said circular gear body eccentric to the axis of said hub,
a plastic casing molded over said toothed portion on said circular gear body and enclosing a peripheral portion of said body radially inwardly of said toothed portion,
and a plastic sleeve bonded to and encasing said cylindrical drive eccentric.

2. An integral gear and drive eccentric unit comprising
a circular gear body having teeth encircling the perimeter of said body,
a hub integral with said body and having a central bore therethrough for mounting said unit on a shaft,
a cylindrical drive eccentric integral with said body and extending from one side of said circular gear body eccentric to the axis of said bore,
a plastic casing molded over said teeth on said circular gear body and enclosing a peripheral portion of said body radially inwardly of said teeth,
and a plastic sleeve bonded to and encasing said cylindrical drive eccentric.

3. An integral gear and drive eccentric unit comprising
a circular body having teeth encircling the perimeter of said body,
a plastic casing molded over said teeth and enclosing a peripheral portion of said body radially inwardly of said teeth,
a hub integral with and centrally disposed on said body for mounting said unit on a shaft,
a cylindrical drive eccentric integral with said body and extending from one side of said circular gear body eccentric to the axis of said hub,
a plastic sleeve molded over the cylindrical surface of said drive eccentric,
and plastic means molded as a part of said sleeve engaged with at least one offset recess in said cylindrical surface of the drive eccentric to retain said sleeve against movement relative to said eccentric.

4. An integral gear and drive eccentric unit comprising
a circular body having teeth encircling the perimeter of said body,
a hub integral with said body and having a central bore therethrough for mounting said unit on a shaft,
a cylindrical drive eccentric integral with said body and extending from one side of said circular gear body eccentric to the axis of said bore,
a plurality of holes extending through said body and intersecting the cylindrical surface of said drive eccentric,
a plastic casing molded over said teeth on said circular gear body and enclosing a peripheral portion of said body radially inwardly of said teeth,
and plastic molded over the cylindrical surface of said eccentric and extending into said holes to retain said sleeve against movement relative to said eccentric.

5. A unitary gear and drive eccentric for use as a unit in a timing chain drive and fuel pump drive of an internal combustion engine comprising
a circular die-cast metal body having teeth encircling the perimeter of said body,
a plastic casing molded over said teeth and enclosing a peripheral portion of said body radially inwardly of said teeth,
a hub integral with said body and having a central bore therethrough for mounting said unit on a shaft,
a cylindrical drive eccentric die-cast integral with said body and extending from one side of said circular gear body eccentric to the axis of said bore,
said body having a plurality of holes formed to extend therethrough and intersect the cylindrical surface of said drive eccentric,
and plastic molded over said cylindrical surface and extending into said holes to retain said sleeve against movement relative to said eccentric.

References Cited by the Examiner

UNITED STATES PATENTS 3,199,364   8/1965   Dew _____ 74—443 X

DAVID J. WILLIAMOWSKY, *Primary Examiner.*

L. H. GERIN, *Assistant Examiner.*